W. L. GLORIEUX.
Metallurgic Crucible.
No. 199,823. Patented Jan. 29, 1878.
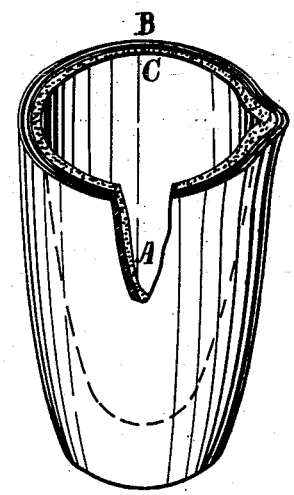
Attest.
P. J. Inslee
A. D. Wagner.
Inventor.
Wm L. Glorieux,
By O Drake, Atty

UNITED STATES PATENT OFFICE.

WILLIAM L. GLORIEUX, OF NEWARK, NEW JERSEY.

IMPROVEMENT IN METALLURGIC CRUCIBLES.

Specification forming part of Letters Patent No. 199,823, dated January 29, 1878; application filed November 23, 1877.

*To all whom it may concern:*

Be it known that I, WILLIAM L. GLORIEUX, of the city of Newark, in the county of Essex and State of New Jersey, have invented certain new and useful Improvements in Crucibles; and I do hereby declare that the following is a full, clear, and exact description thereof, which will enable others skilled in the art to which it appertains to make and use the same, reference being had to the accompanying drawing, and to letters of reference marked thereon, which form a part of this specification.

This invention relates to an improved mode of constructing crucibles used in metallurgy for the refining and reduction of metals.

The following is a full and exact description of my improved crucible, reference being had to the annexed drawing, where the crucible is shown with a fragment broken from the side, to exhibit the peculiarity of its composition.

My improved crucible is made by coating an ordinary sand pot with black-lead, graphite, or plumbago, each of the materials possessing special advantages not contained in the other, and the two having never hitherto been united in one vessel.

In separating the precious metals from their bases in particular, a black-lead pot would be preferable, as not liable to crack and lose out the gold, &c.; but such a pot is greatly affected by saltpeter and other fluxes, so that at a temperature sufficient to melt gold it would be eaten through by the chemicals, and its contents lost. On the other hand, a sand pot is very liable to crack, even on the first heating, entailing considerable expense to recover the metals lost out.

I therefore construct a crucible, pot, or vessel coated on its interior with sand or similar materials of suitable thickness, and on the outside with plumbago or other materials of similar properties, the two constituting a vessel for smelting and refining, with all the desired qualities.

I do not limit myself to the mode of construction shown in the drawing, where the whole pot is shown of equal parts of the two materials from top to bottom, claiming the right to vary the application of the two ingredients, so that I may make a black-lead pot, partially lined with sand, to resist the fluxes, or a sand pot coated with plumbago chiefly where the greatest heat strikes it.

In the drawing, A represents a break in the crucible, where the two substances are plainly shown, and B shows the outer coating of plumbago, while C indicates the sand lining.

I do not claim a black-lead retort or crucible for separating zinc from gold and silver alloys, as retorts made of black lead alone have been used for this purpose.

By inserting the clay lining, as set forth, a greatly improved article is produced, possessing the highly refractory properties of the black lead and the purity of the fire-clay or composition lining.

Without claiming a plumbago retort or crucible,

I claim—

As a new article of manufacture, a crucible or retort having an outer facing of black-lead, and inner lining of sand composition, or its equivalent, as and for the purpose set forth.

In testimony that I claim the foregoing as my own I hereto affix my signature in presence of two witnesses.

WILLIAM L. GLORIEUX.

Witnesses:
OLIVER DRAKE,
FREDERICK T. JOHNSON.